United States Patent Office 3,027,199
Patented Mar. 27, 1962

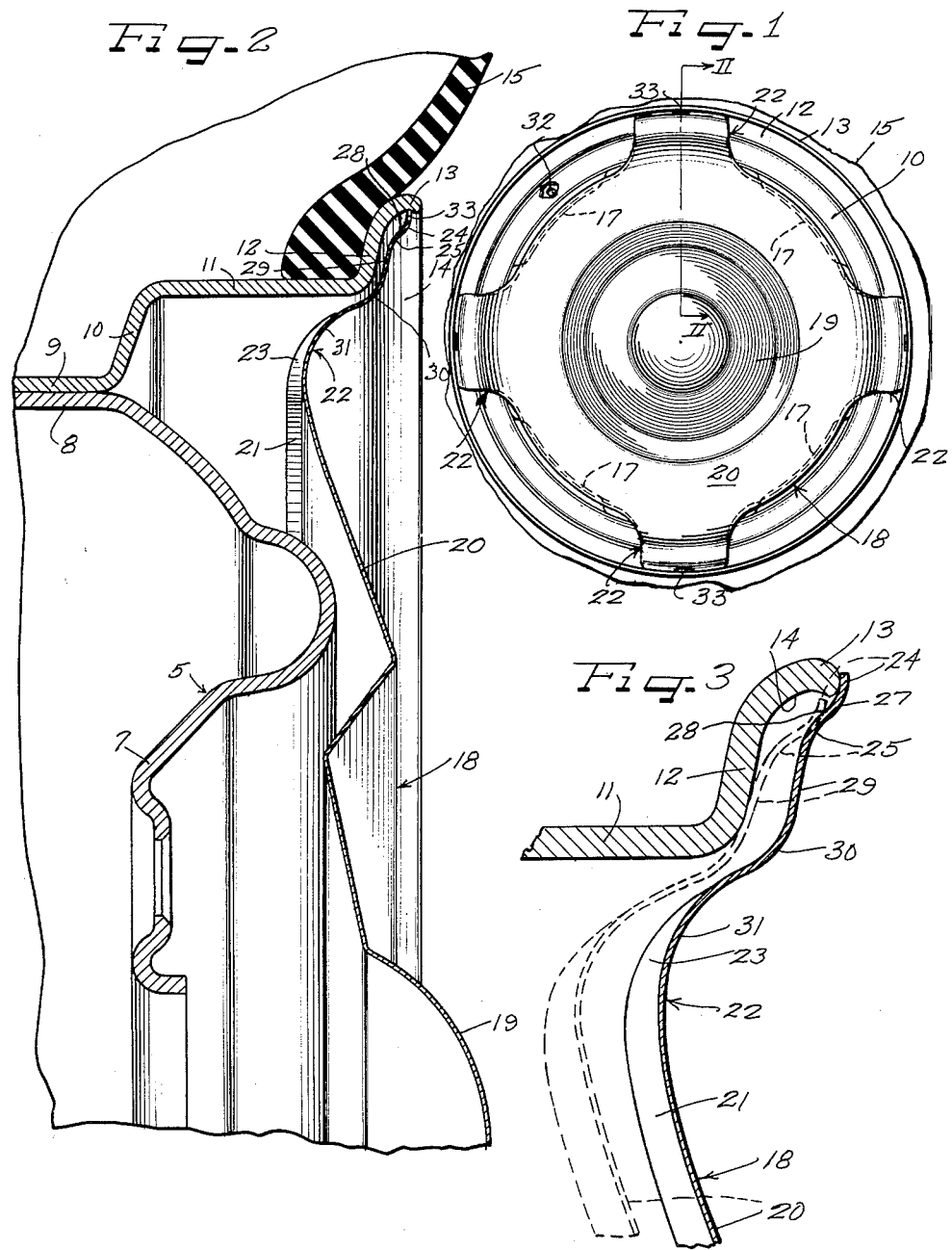

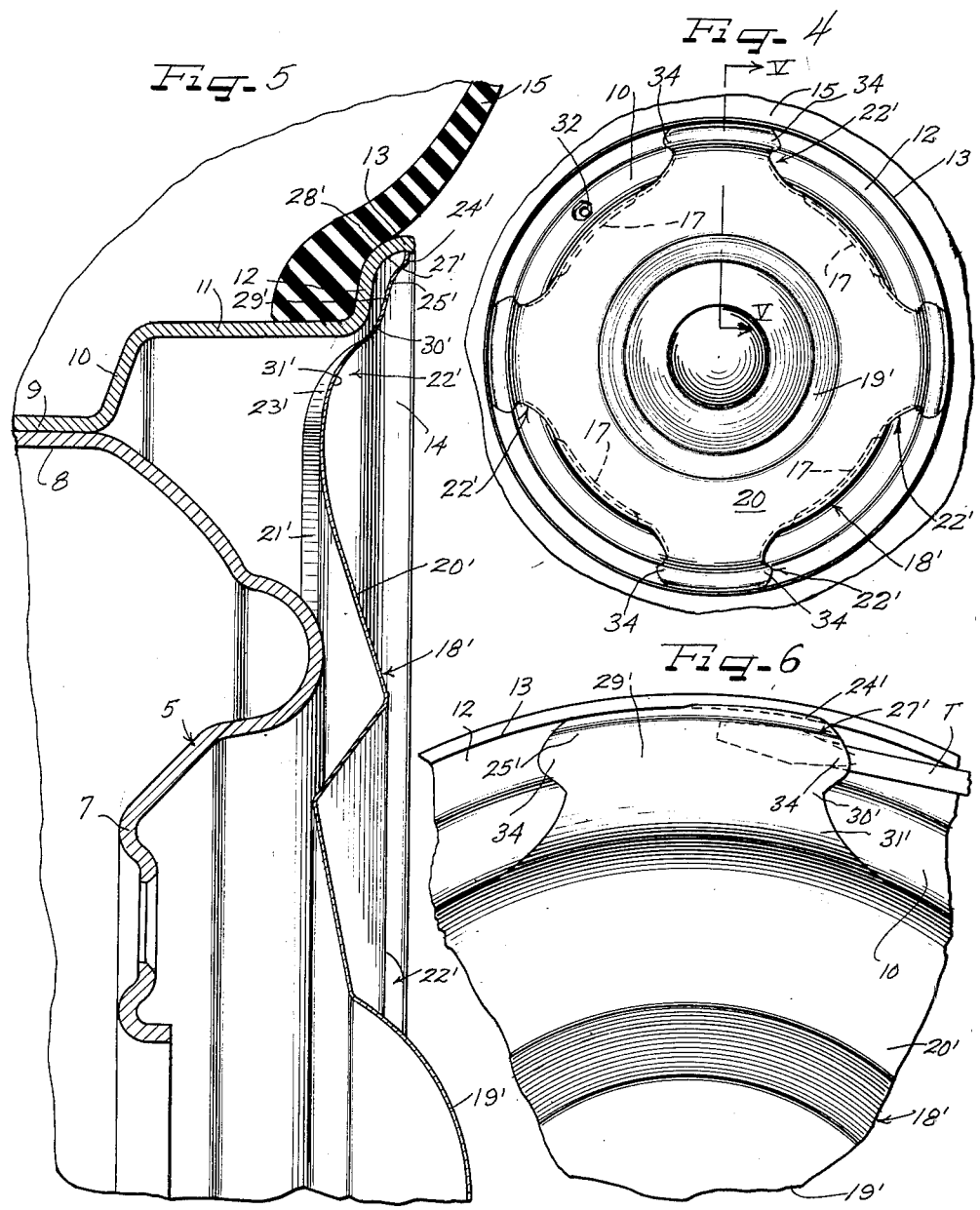

3,027,199
WHEEL COVER
George Albert Lyon, Detroit, Mich., assignor to Lyon Incorporated, Detroit, Mich., a corporation of Delaware
Filed Sept. 25, 1958, Ser. No. 763,265
5 Claims. (Cl. 301—37)

The present invention relates to improvements in wheel structures and more particularly concerns the ornamental and protective covering of the outer sides of vehicle wheels.

An important object of the present invention is to provide in a wheel structure an improved cover for press-on, pry-off disposition over the outer side of the wheel.

Another object of the invention is to provide an improved wheel structure having a grooved terminal flange, with a novel cover provided with retaining arms having terminals engageable in press-on, pry-off relation with the terminal flange.

A further object of the invention is to provide an economy wheel cover involving a minimum of material and minimum fabrication operations so that it can be produced and sold at low cost.

Still another object of the invention is to provide an improved wheel cover having novel retaining means for interengagement with a wheel part for retaining the cover on the outer side of the wheel.

Yet another object of the invention is to provide an improved wheel structure affording a novel assembly of a cover over the outer side of the wheel and enabling free air circulation through the wheel and the cover for cooling the wheel and a brake drum with which the wheel may be associated.

Other objects, features and advantages of the present invention will be readily apparent from the following detailed description of certain preferred embodiments thereof taken in conjunction with the accompanying drawing, in which:

FIGURE 1 is an outer side elevational view of a vehicle wheel structure embodying features of the invention;

FIGURE 2 is an enlarged fragmentary radial sectional detail view taken substantially on the line II—II of FIGURE 1;

FIGURE 3 is an enlarged schematic sectional detail view taken in substantially the same plane as FIGURE 2 but showing how the cover retaining arms coact with the tire rim during initial placement and during press-on of the cover;

FIGURE 4 is an outer side elevational view of a modification of the cover;

FIGURE 5 is a fragmentary radial sectional detail view taken substantially on the line V—V of FIGURE 4; and FIGURE 6 is a fragmentary enlarged outer side elevational view of the wheel structure showing one of the retaining arms in process of being pried free from the tire rim.

The present invention is especially adapted for a vehicle wheel and more particularly an automobile wheel having a disk spider wheel body 5 provided with the usual bolt-on central flange 7 by which the wheel is adapted to be attached to the customary axle flange immediately over a brake drum of the vehicle. At its outer margin the wheel body 5 has an axially extending attachment flange 8 by which the wheel body is attached to a base flange 9 of a drop center, multi-flange tire rim including a side flange 10 extending generally radially outwardly from the outer side of the base flange 9 and merging with a generally axially outwardly extending intermediate flange 11 from which extends a terminal flange including a generally radially outwardly extending portion 12 and a generally axially outwardly extending terminal lip portion 13 providing a generally radially inwardly facing groove 14. A pneumatic tire 15 of the tubeless type is adapted to be carried by the tire rim. At juncture of the wheel body 5 and the tire rim, the attachment flange 8 of the wheel body is provided at suitable intervals such as four equally circumferentially spaced with insets affording wheel openings 17 through which air is adapted to circulate for cooling the wheel and the brake drum with which the wheel is associated.

For ornamentally and protectively covering the outer side of the wheel, a wheel cover 18 (FIGS. 1-3) is provided which is adapted to be made from thin sheet metal such as stainless steel, brass, aluminum alloy and the like, sheet or strip efficiently and advantageously die pressed or drawn and suitably finished as by polishing and plating or otherwise. Herein, the cover 18 is provided with a central crown portion 19 for overlying the bolt-on flange 7 in suitably spaced relation to house the axle parts which customarily project through the bolt-on flange of the wheel. About the central crown portion 19 is a marginal annular portion 20 which may be of generally frusto-conical shape as shown extending generally radially outwardly and axially inwardly to a diameter about as great as the diameter of the wheel body 5 so as to concealingly overlie the same in spaced relation. On its edge, the marginal cover portion 20 is provided with a turned preferably axially inwardly extending angular narrow reinforcing and finishing flange 21 which substantially stiffens the periphery of the cover.

For press-on, pry-off retention of the cover over the outer side of the wheel, the marginal portion 20 of the cover is provided at suitable circumferentially spaced intervals with cover-retaining arm members 22 formed integrally in one piece with the cover body. Advantageously, there are four of the retaining arms 22 of maximum width at juncture with the cover marginal portion 20 and extending therefrom on a concave curvature or dished form in radial contour.

In order to afford substantial resilient stiffness in the body portions of the retaining arms 22, the sides merge flaringly on preferably large concave radius, as best seen in FIGURE 1, with the convex radius of the edge of the cover marginal portion 20 intermediate the arms and actually comprising the major peripheral extent of the cover edge. The reinforcing flange 21, which is on the entire periphery of the cover member portion 20 except where interrupted by the arms 22, continues along each side of each of the arms 22 to provide respective side reinforcing flange extensions or turned reinforcing flanges 23. Thereby, the body portions of the retaining arms 22 are stiffly resiliently tied into the stiffly resiliently reinforced cover marginal portion 20 from which the arms project.

Means are provided on the retaining arms 22 for not only retaining interengagement with the wheel, but also support of the cover on the wheel. To this end, the retaining arms are constructed in a novel manner to interengage with the terminal flange of the tire rim, having respective terminals 24 normally projecting at their extremities to a diameter to overlie the tip of the terminal flange lip portion 13 as shown in full outline in FIGURE 3 and projecting substantially radially outwardly. Radially inwardly from the terminal 24 each of the retaining arms 22 is of stepped or sinuous preferably substantially double ogee curvature affording not only important structural but also functional advantages.

By its radial sinuosity, the retaining arm 22 has a plurality of coactive transverse, that is circumferentially extending, reinforcing ribs for enhancing the resilient stiffness of the arm. Nevertheless, the relationship of the contours of the arm to the opposing tire rim flanges affords a novel coaction with the tire rim to facilitate application of the cover to the outer side of the wheel and proper symmetrical, balanced retaining engagement of the retaining terminals 24 with the terminal flange portion 13.

As shown, each of the retaining arms 22 has immediately radially inwardly adjacent to the retaining terminal 24 an indented transverse rib 25 providing at juncture with the terminal a generally axially outwardly projecting juncture rib 27 and substantially at juncture of the ribs 25 and 27 a generally radially outwardly facing centering shoulder 28 adapted during initial assembly of the arm with the terminal flange portion 13 to coact with the radially inner side of the terminal flange lip extremity or tip to define a substantially centered relation of the cover over the wheel and thereby facilitates final press-on of the retaining arms. Moreover, by the double rib reinforcement afforded by the ribs 25 and 27 at the base of the short, angularly related terminal 24, a high degree of stiffness to resist bending deformation and service stresses is afforded for the terminal 24 in each instance.

Radially inwardly from the indented rib 25 is a generally radially extending portion 29 which is arranged to oppose and overlie the radially extending terminal flange portion 12. At its radially inner end, the portion 29 merges into an outwardly convex rib 30 generally complementary to the intermediate rim flange 11 and the terminal flange portion 12 and merging into a radially innermost outwardly concave arm body rib 31 carrying the inturned reinforcing flange arm side extension portions 23. The terminal 24 and the intermediate portion 29 on each arm 22 together comprise a resiliently flexible end portion. The ribs 25 and 27 have been provided to augment the ability of the arms 22 to resist accidental disassembly and to stiffen the terminal 24.

In addition to the inherent resilience afforded by the rib shape of the several stiffening ribs of the retaining arm 22, additional resilient stiffness is afforded by the arcuate lengths of the several ribs by virtue of the substantial width of the arm in each instance and general conformance of the ribs to the circumferential circularity of the cover.

As will be observed, the construction and arrangement of the terminal 24 and the intermediate arm portion 29 affords an axially outwardly offset relationship of the terminal 24 to the inset intermediate portion 29 which is predetermined to be slightly less than the extent of projection of the tip of the terminal flange portion 13 axially outwardly beyond the radially extending terminal flange portion 12. As a result, when the cover is pressed axially inwardly, each of the retaining arms 22 will resiliently flex axially inwardly toward the tire rim from which the arm is held spaced initially by the engagement of the terminal 24 against the tip of the terminal flange portion 13. As flexure increases, the terminal 24 is drawn radially inwardly by flexing movement of the body portions of the arm 22, especially radially outwardly beyond the ends of the side reinforcing flange portions 23. As the extremity of the terminal 24 snaps axially inwardly from the tip of the terminal flange portion 13, the intermediate arm portion 29 bottoms against the radially inner portion of the radially extending terminal flange portion 12 and stops further axially inward movement of the retaining arm, as shown in dash outline in FIGURE 3. This orients the retaining tip of the terminal 24 adjacent to the axially outer side of the terminal flange groove 14. Then, automatically upon release of axially inward pressure against the cover, the retaining arm 22 tends to spring radially outwardly toward its normal maximum extension, and the tip of the terminal 24 engages in radially outwardly thrusting gripping, generally biting relation within the terminal flange groove 14. Since the engaged groove surface is of a slightly smaller diameter than the normal extension diameter of the terminal tip, a firm thrusting retaining engagement symmetrically about the cover is effected by each of the arm terminals.

By virtue of the resilient stress or tension developed in the sinuous retaining arms 22, the intermediate arm portions 29 spring resiliently away from the opposing terminal flange portion 12 to a limited extent as shown in FIGURE 2. The terms "stress" and "tension" have been used herein as synonymous referring to the fact that the arms or fingers are radially displaced when the cover is assembled on the wheel. The cover is thus supported in floating spaced relation to the tire rim and the wheel body 5 and is well adapted to absorb effectively axially inward curbing or like pressures thereagainst without damage. Nevertheless, because of the general radially inward convergence of the arms 22 toward juncture with the cover marginal portion 20, with such juncture substantially inset generally telescopically into the normal groove space between the tire rim intermediate flange 11 and the wheel body, there is a high resistance to wind or vibration induced drumming or diaphragm action of the cover. Such resistance is enhanced by the edge reinforcing flange 21 and its arm side extensions 23.

To afford maximum air circulation advantage, the arms 22 of the cover are preferably oriented to overlie the portions of the wheel between the wheel openings 17 as best seen in FIGURE 1 so that the openings and the inset spaces about the periphery of the cover between the arms 22 provide free air circulation passage in each instance.

Between a pair of the arms 22 the inset periphery of the cover 18 affords clearance for a valve stem 32 carried by the side flange 10 of the tire rim.

In order to facilitate prying of the cover 18 free from the wheel, each of the retaining arms 22 may be provided in the tip of the retaining terminal 24 thereof with a pry-off notch 33 receptive of the tip of a pry-off tool (not shown) such as a screwdriver which may thereby be fulcrumed against the adjacent portion of the tip of the terminal flange lip 13 for levering and prying the tip of the terminal 24 free from the terminal flange. In the modification of FIGURES 4, 5 and 6, a cover 18' is disclosed as applied to the outer side of a vehicle wheel which in all respects is identical with the wheel of FIGURES 1-3. The cover 18' is in all respects identical with the cover 18 except for a modification of the retaining arms or fingers 22' and primed reference numerals have accordingly been applied to the cover 18' to show structural and functional similarity, it being understood that the description in connection with the cover 18 applies with equal effect to the extent applicable.

Instead of providing the retaining terminals 24' of the retaining arms 22' with pry-off tool notches, each of the retaining arms has as side extensions of the intermediate radially extending portion 29', respective circumferentially oppositely projecting pry-off ear lobe extensions 34 (FIGS. 4 and 6). Inasmuch as the intermediate arm portion 29' is in spaced relation to the underlying terminal flange portion 12 in the retaining engagement of the retaining arms with the terminal flange, as best seen in FIG. 5, the end of a pry-off tool T (FIG. 6) can be inserted between the arm portion 29' and the terminal flange portion 12 from either side of the arm portion 29', the respective side ear extensions 24 provide effective leverage extremities for the pry-off tool. Thus as the pry-off tool is fulcrumed at its tip against the terminal flange portion 12, leverage of the pry-off tool against the extremity of the pry-off ear 34 engaged thereby causes the adjacent portion of the arm terminal 24' to be slidably disengaged progressively from the terminal flange portion 13, as shown in FIGURE 6, starting at the side extremity of the retaining edge of the terminal nearest the point of pry-off leverage. As the arm terminal progressively releases in response to the pry-off leverage, the pry-off tool is advanced in under the arm being pried free to increase pry-off leverage advantage.

In order to enhance pry-off, it will be noted that the pry-off ear lobe extensions 34 taper at their radially outer sides toward the extremities of the terminal 24' so that the pry-off wing extremities are substantially offset in circumferential direction relative to the adjacent associated ends of the retaining terminal 24'.

It will be understood that modifications and variations may be effected without departing from the scope of the novel concepts of the present invention.

I claim as my invention:

1. In a wheel structure including a wheel body and a tire rim having a terminal flange with a generally axially outwardly projecting annular portion, a one-piece cover member for disposition over the outer side of the wheel including a cover body of substantially smaller diameter than said terminal flange portion for overlying the wheel body and having a plurality of circumferentially spaced cover retaining arms of generally sinuous radial section projecting from the margin of the cover body and supporting the cover on the terminal flange and having short and stiff generally radially outwardly projecting terminals engaging retainingly with said terminal flange portion in press-on, pry-off relation, said arms extending generally radially and axially outwardly from divergent juncture with the cover body and being under resilient tension thrust toward said terminals reacting with the engaged terminal flange to maintain the arms spaced from the underlying portions of the terminal flange.

2. In a wheel structure including a wheel body and a tire rim having a terminal flange provided with a radially outwardly extending portion joining an axially outwardly projecting portion, a one-piece cover member for disposition over the outer side of the wheel including a cover body of substantially smaller diameter than said terminal flange portions for overlying the wheel body and having a plurality of circumferentially spaced cover retaining arms of generally sinuous radial section projecting from the margin of the cover body and supporting the cover on the terminal flange and having short and stiff generally radially outwardly projecting terminals engaging retainingly with the axially outwardly extending terminal flange portion in press-on, pry-off relation, said arms extending generally radially and axially outwardly from divergent juncture with the cover body and being under resilient tension thrust toward said terminals reacting with the engaged axially outwardly extending terminal flange portion to maintain the arms spaced from the underlying radially extending portion of the terminal flange, each of said arms having an intermediate generally radially extending portion inset relative to the terminal of the arm and arranged to bottom against the opposing radially extending portion of the terminal flange during press-on manipulation of the arm relative to the tire rim.

3. In a wheel structure, a wheel including a multi-flanged tire rim having stepped intermediate, radial and terminal rim flanges, a one-piece cover for disposition on the wheel having circumferentially spaced resiliently deflectable cover retaining arms extending generally radially outwardly from an outer cover margin of the cover, the arms each being joined with the outer cover margin radially and axially adjacent the terminal rim flange and with the arms each being generally of a stepped cross-sectional configuration following generally the stepped configuration of the intermediate, radial and terminal rim flanges, the arms each having an arm terminal which axially confronts and engages a tip end of the terminal rim flange antecedent to the attachment of the cover to the wheel, the arms being biasable in an axially inwardly direction upon the application of an axial force against the cover to cause the arm terminals to be guided radially inwardly over the tip end of the terminal rim flange and axially inwardly into edgewise resilient cover retaining engagement with a radially inwardly facing surface of the terminal rim flange, said arms when assembled on the wheel being spaced from the tire rim except where the arm terminals are retainingly engaged with the terminal rim flange.

4. The wheel structure of claim 3 further characterized by said arms being integral and in one piece with said cover margin and yieldable in unison together in the assembly of the cover on the wheel.

5. In a wheel structure including a wheel body and a tire rim having a terminal flange provided with a radially outwardly extending portion joining an axially outwardly projecting portion, a cover member for disposition over the outer side of the wheel including a cover body of substantially smaller diameter than said terminal flange portions for overlying the wheel body and having a plurality of circumferentially spaced cover retaining arms of generally stepped radial section projecting from the margin of the cover body and supporting the cover on the terminal flange and having short and stiff generally radially outwardly projecting terminals engaging retainingly with the axially outwardly extending terminal flange portion in press-on, pry-off relation, said arms extending generally radially and axially outwardly from divergent juncture with the cover body and being under resilient tension thrust toward said terminals reacting with the engaged axially outwardly extending terminal flange portion maintaining the arms spaced from the underlying radially extending portion of the terminal flange, each of said arms having an intermediate generally radially extending portion inset relative to the terminal of the arm and arranged to bottom against the opposing portion of the terminal flange during press-on manipulation of the arm relative to the tire rim, the cover body and the arms at the divergent juncture being in one piece and yieldable substantially in unison together only in a generally radially and axially inwardly direction until said terminals are retainingly engaged with the terminal flange.

References Cited in the file of this patent

UNITED STATES PATENTS

| | | |
|---|---|---|
| 2,394,958 | Wood | Feb. 12, 1946 |
| 2,525,816 | Lyon | Oct. 17, 1950 |
| 2,683,630 | Lyon | July 13, 1954 |
| 2,690,357 | Lyon | Sept. 28, 1954 |
| 2,729,509 | Lyon | Jan. 3, 1956 |
| 2,757,985 | Lyon | Aug. 7, 1956 |

FOREIGN PATENTS

| | | |
|---|---|---|
| 630,176 | Great Britain | Oct. 6, 1949 |
| 524,139 | Canada | Apr. 24, 1956 |